April 16, 1968     E. ZILLMER     3,377,916
PHOTOGRAPHIC PROJECTOR WITH AUTOMATIC LIGHT-BLOCKING
AND SLIDE-CHANGING CONTROLS
Filed March 16, 1966     2 Sheets-Sheet 1
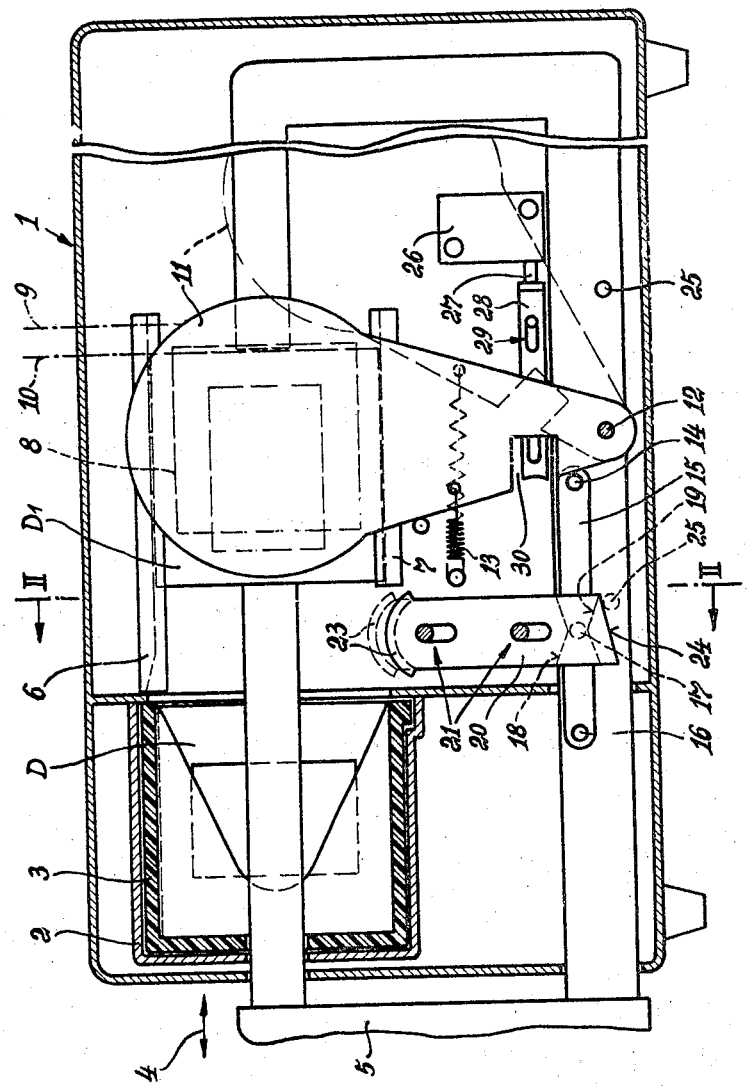
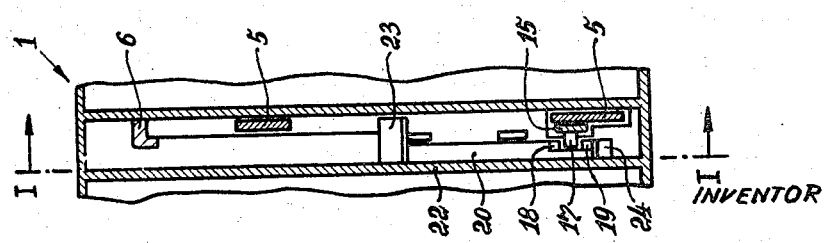
INVENTOR 3,377,916
PHOTOGRAPHIC PROJECTOR WITH AUTOMATIC LIGHT - BLOCKING AND SLIDE - CHANGING CONTROLS
Erich Zillmer, Braunschweig, Germany, assignor to Voigtlander A.G., Braunschweig, Germany, a corporation of Germany
Filed Mar. 16, 1966, Ser. No. 534,895
Claims priority, application Germany Mar. 23, 1965, Z 11,424
6 Claims. (Cl. 88—28)

The present invention relates to photographic projectors.

In particular, the present invention relates to that type of photographic projector in which a slidechanging means can be actuated to automatically carry out an operating cycle during which it shifts a slide from a magazine to a projecting position and then back to the magazine, whereupon the magazine advances through a predetermined increment to bring the next slide into position to be acted upon by the slide-changing means during its next operating cycle. The present invention deals particularly with that type of photographic projector which includes a light-blocking means preventing the light from reaching the projection screen during the time when a slide is not in a projecting position, so that in this way during the short intervals between actual projection of images onto the screen the screen will not be brightly illuminated to prevent highly unpleasant intermittent bright illumination of the screen at those intervals between actual projection of images thereon.

It is conventional to construct photographic projectors of this type in such a way that the light-blocking means is actuated in response to movement of the slide-changing means so as to be displaced to its nonblocking position, freeing the beam of image-projecting light for movement to the screen when the slide-changing means displaces a slide from the magazine to the projecting position. However, with these conventional constructions if it should happen that an empty magazine compartment is in the operating range of the slide-changing means, this slide-changing means will carry out its normal operating cycle without any slide, with the result that the light-blocking means will still be displaced to its non-blocking position so that in this case there will be an undesirably bright illumination of the screen. Such undesirable bright illumination of the screen when there is no slide present in the projecting position will take place not only when there happens to be an empty magazine compartment in the operating range of the slide-changing means but also when the projector is operated without a magazine, and when the magazine reaches its end position and initiates a further operating cycle o fthe slide-changing means. Such undesirable glare on the screen will also be provided in the case where a magazine is only partially filled with a series of slides and upon reaching the end of the series of slides another operating cycle of the slide-changing means is carried out. In all of these cases the viewers who look at the screen will be suddenly subjected to an unpleasant bright glare.

In order to avoid this problem it has already been proposed, as disclosed in copending application Ser. No. 462,534, now Patent No. 3,334,544 of the same inventor, to actuate the light-blocking means not directly from the slide-changing means but rather directly from a slide itself, so that in the case where the slide-changing means operates without a slide the light-blocking means will remain in its blocking position preventing any glare on the projection screen.

When the light-blocking means remains in its light-blocking position because of empty magazine compartments, as is the case where, for example, the operator has removed selected slides which he does not wish to project from a series of slide in a magazine, leaving empty magazine compartments, then there will be at these locations relatively long dark intervals on the projection screen interrupting the sequential projecting of images onto the screen in an undesirable manner. Such an interruption will last until the operator of the projector has again brought about operation of the slide-changer to shift a slide to the projecting position. Thus, the duration of the dark interval during which the rhythmic sequential projection of the images is interrupted is determined by the time it takes for the operator of the projector to realize that no slide has been shifted to a projecting position and to continue to operate the slide-changer until the next slide is moved into the projection position.

It is a primary object of the present invention to render the dark interval resulting from lack of a slide to be shifted by the slide-changing means independent of the reaction time of the operator of the slide projector and furthermore to reduce this dark interval to a minimum duration.

In particular, it is an object of the invention to provide automatic operation of the projector in a manner reducing such a dark interval to such an extent that it is practically unnoticed by the viewers.

Furthermore, it is an object of the invention to provide for the automatic operation of the projector in the above manner while maintaining a blocking of the light when no slide is moved to the projecting position, so that the advantage of elimination of undesirable glare is also maintained.

The photographic projector of the invention includes a slide-changing means of the above type which carries out an operating cycle during which it shifts a slide from a magazine to a projecting position and then back to a magazine whereupon the magazine advances through a given increment which will situate the next slide in a position to be acted upon the slide-changing means during its next operating cycle. A light-blocking means is provided for blocking the passage of light through the projecting position, and this light-blocking means is movable between a light-blocking position where it blocks the passage of light through the projecting position of the slide and a non-blocking position freeing the light for passage through a slide at the projecting position. Also, the structure of the invention includes an actuating means for actuating the slide-changing means to carry out its cycle of operation. An operating means is carried by the slide-changing means for movement therewith, and this operating means of the invention is movable between a pair of positions in one of which it will operate the actuating means to actuate the slide-changing means to carry out a cycle of operations and in the other of which the operating means will move the light-blocking means from its blocking to its non-blocking position. In accordance with the present invention a scanning means is provided for determining whether or not a slide is actually moved by the slide-changing means. This scanning means of the invention has a scanning position situated in the path of movement of a slide and is displacable from this scanning position into and end position by a slide which upon being shifted by the slide-changing means displaces the scanning means from its scanning position to its end position distant from the scanning position. When the scanning means is in its scanning position it automatically locates the operating means in its one operating position where it will operate the actuating means to produce the next operating cycle of the slide-changing means in an automatic manner, while the light-blocking means remains in its blocking position, whereas when the scanning means is displaced by a slide from its scanning position to its end position it will then cooperate with the operating means to locate it in the other of its pair of positions where this operating means will not operate the actuating means but will instead displace the light-blocking means from its blocking to its nonblocking position.

The invention is illustrated by way of example in the accompanying drawings which form part of the application and in which:

FIG. 1 is a fragmentary front elevation of a slide-changer and a fragmentarily illustrated projector, the section of FIG. 1 being taken along line I—I of FIG. 2 in the direction of the arrows;

FIG. 2 is a section taken along line II—II of FIG. 1 in the direction of the arrows.

Figure 3:
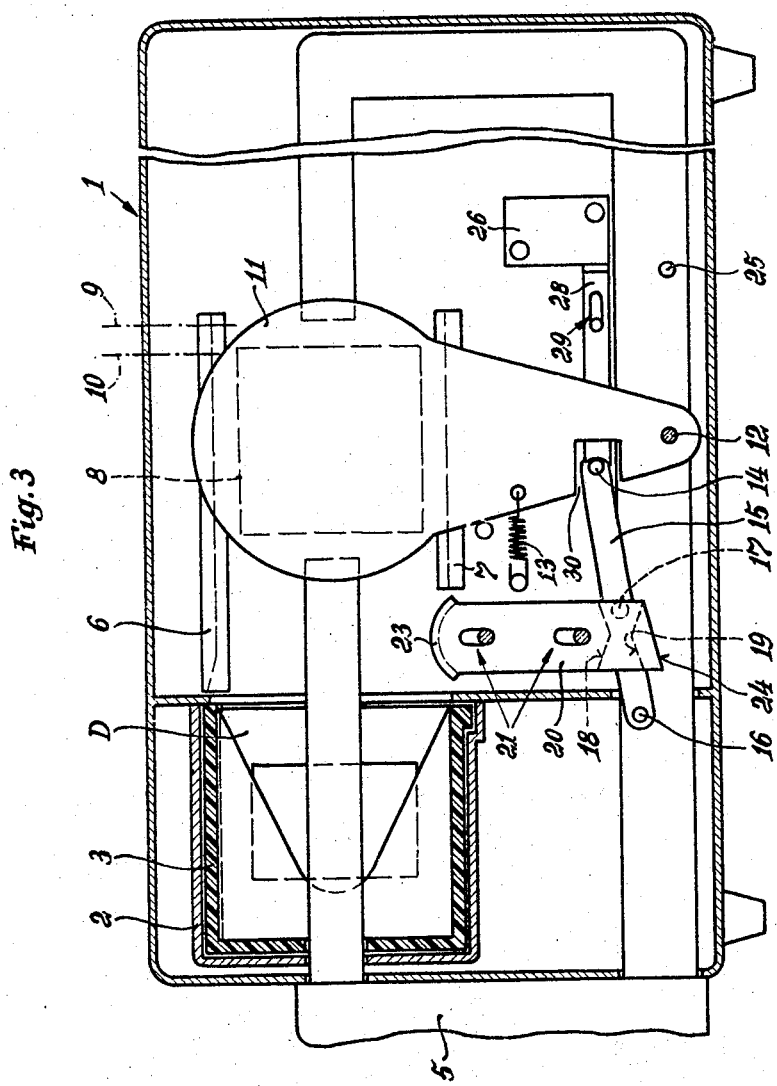
FIG. 3 shows the parts of FIG. 1 in a different position.

The fragmentarily illustrated photographic projector 1 is provided by way of intermediate walls 2 thereof with a guide which guides a magazine 3 for movement in a direction perpendicular to the planes of FIGS. 1 and 3. This magazine 3 holds in its interior a series of slides D. The slide-changing means 5 carries out an operating cycle during which it moves back and forth in the direction indicated by the double-headed arrow 4 of FIG. 1, and during each operating cycle this slide-changing means 5 will engage a slide which is situated in the operating range of the slide-changing means and displace it out of the magazine 3 along a pair of guide rails 6 and 7 to a projecting position where the slide aligns with an imaging window 8 through which light passes for projecting an image of the slide onto a suitable screen. Thereafter, the slide-changing means 5 returns the slide into its compartment within the magazine 3. In FIG. 1 the parts are shown in a position where the slide D1 is in the process of being shifted by the slide-changing means 5 toward the projecting position but has not yet reached the projecting position. When in the projecting position, the right edge of the slide will be located along the dot-dash line 9, while in the position of FIG. 1 this right edge of the slide is situated at the dot-dash line 10. In this latter position of the slide the window 8 is still covered by the light-blocking means 11 in the form of an opaque plate turnable about a stationary pivot 12 carried by the projector. A spring 13 is operatively connected with the plate 11 to urge the latter to its blocking position shown in solid lines in FIG. 1. During the continued movement of the slide D1 from position 10 into the end position 9, a pin 14 or the like which is connected with the slide-changing means 5 comes into engagement with an edge of the light-blocking means 11 to turn the latter about its pivot 12 into the non-blocking position indicated in dotted lines in FIG. 1, thus uncovering the window 8 so that the light can pass therethrough. During the return movement of the slide-changing means, the spring 13 returns the light-blocking means 11 to its blocking position.

The structure and operation thus far described is in general well known. Thus, with a known photographic projector there will be at each operating cycle of the slide-changing means a movement of the light-blocking means away from its blocking position, even in the case where there is no slide in the operating range of the slide-changing means so that it goes through an operating cycle without actually shifting a slide. In this case, the brightly illuminated screen dazzles the viewer in an undesirable manner.

In order to avoid this latter drawback as well as to provide further simplification in the operation of the projector, the following structure is provided.

The pin 14 which engages and turns the light-blocking plate 11 is not fixedly carried by the slide-changing means 5 for movement therewith. Instead, this pin 14 forms part of an operating means which includes a lever 15 turnably carried on a pin 16 which is fixed to the slide-changing means 5. The frictional resistance to turning of the lever 15 on the pin 16 is sufficiently great so that the lever 15 will remain in whichever angular position it has been turned to on the pin 16. In order to be placed in different operating positions, the operating lever 15 is provided with a cam-follower pin 17 which is movable into engagement with a pair of inclined camming elements 18 and 19 which form part of and are carried by a scanning means formed by a slide member 20 which is slidable in a direction perpendicular to the direction of movement of the slide-changing means 5. For this purpose the scanning member 20 is provided with a pin-and-slot guide 21 formed by pins carried by a wall 22 (FIG. 2) and extending into slots of the slide-member 20, as shown in FIG. 1. The slide member 20 frictionally engages the wall 22 with a frictional force sufficient to maintain the scanning means either in an upper scanning position or in a lower end position distant from the scanning position. The scanning means includes an upper, convexly curved scanning head 23 which, when the scanning means is in its upper scanning position, as shown in FIG. 2 and indicated in dotted lines in FIG. 1, is in the path of movement of the lower edge portion of a slide shifted between the magazine 3 and the imaging window 8. The scanning slide member 20, which will thus frictionally remain in whichever position it is shifted to, is provided with a placing means which will displace the slide from its lower lower inclined camming edge 24 forming part of a dis-end position to its upper scanning position. This displacing means includes a pin 25 fixedly carried by the slide-changing means and engaging the camming edge 24 when the slide-changing means 5 has almost returned a slide all the way back into the magazine 3, so that in this way at the end of each operating cycle of the slide-changing means the scanning means 20 will be automatically returned to its upper scanning position.

The projector is also provided with an actuating means 26 for automatically bringing about an operating cycle of the slide-changing means 5. This actuating means 26 may take the form, for example, of an electrical switch which will close a circuit to electrical structure which will automatically bring about the desired cycle of operations in a known way, although it may also act in a purely mechanical manner to automatically bring about a cycle of operations for the slide-changing means when the actuating means 26 is operated. The switch 26 is provided with a switch button 27 which will close the switch when the button 27 is shifted to the right, as viewed in FIG. 1, and this switch button 27 is located in the path of movement of a switch operating slide member 28 guided for movement by a pin-and-slot guiding structure 29.

It is to be noted furthermore, that the light-blocking plate 11 is provided with a cutout 30 in the form of a notch having an open left end, as viewed in FIG. 1.

The above-described structure operates in the following manner:

During each return movement of the slide-changing means where it returns a slide to the magazine 3, the displacing pin 25 will engage the inclined camming edge 24 of the scanning means 20 to displace the latter upwardly to its scanning position shown in FIG. 2 and indicated in dotted lines in FIG. 1, as pointed out above. In this position the upper scanning head 23 is in the path of movement of a slide between the magazine 3 and the lower guide rail 7 for the slide. Thus, when the slide-changing means 5 moves a slide D from the magazine 3 to the window 8, this slide will engage the scanning head 23. Inasmuch as the upper guide rail 6 does not permit upward movement of the slide, the scanning means 20 is compelled to move downwardly into the solid-line position shown in FIG. 1, and this is its end position distant from its scanning position. In this latter end position of the scanning means, the inclined camming element 18 thereof cooperates with the cam-follower pin 17 of the lever 15 of the operating means to situate the latter in that one of its pair of operating positions where the operating pin 14 will, in the above-described manner, engage an edge of the light-blocking means 11 to turn the latter to its non-blocking position.

If, however, there is no slide in the operating range of the slide-changing means 5, the parts will take the position shown in FIG. 3. The scanning means 20 will remain in its upper scanning position since it is not displaced downwardly by a slide, and now the lower camming element 19 of the scanning means will engage the cam-follower pin 17 to turn the operating lever 15 upwardly to the position of FIG. 3 where the operating pin 14 enters into the cutout 30 without turning the light-blocking means 11 from its blocking position. The light-blocking means 11 therefore remains in its position aligned with the window 8, so that there is no undesirable glare for the viewer of projection screen.

The operations as thus far described are suitable for manually operated projectors as well as for projectors which are power-operated. However, for power-operated projectors in which the slide-changing cycles are automatically brought about the following operations are of particular significance.

The turning of the operating lever 15 into its upper operating position shown in FIG. 3 situates the operating pin 14 at the elevation of the switch operating slide 28 so that the continued movement of the slide-changing means 5 to the right, as viewed in FIG. 3, displaces the slide 28 and the switch button 27 to the right, thus closing the switch 26. In this way the operating means has operated the actuating means 26 so as to cause the slide-changing means to automatically carry out the next cycle of operations. The switch 26 will electrically actuate a known structure to provide automatically the next operating cycle of the slide-changing means, or this automatic operation of the slide-changing means may be brought about mechanically. Thus, there will be provided in this way an automatic actuation of the slide-changing means through the next operating cycle, without requiring for this purpose any particular attention or operations by the operator of the projector.

Thus, if it should happen, for example, that there is an empty slide compartment in the magazine which reaches the operating range of the slide-changing means, then there will be at this time an operating cycle of the slide-changing means without a slide actually being shifted thereby, but at the same time the light-blocking means remains in its blocking position and the next operating cycle of the slide-changing means is brought about automatically. The projection operations are therefore merely interrupted by a somewhat longer than usual interval of darkness which ends when the next slide is brought into alignment with the window 8, because when the next slide reaches the operating range of the slide-changing means the parts will again assume the position shown in FIG. 1. This interval of darkness, however, is greater than a normal interval of darkness to such a small extent that it is hardly noticed by the viewers of the projection screen. In other words, during normal operation of the projector the intervals during which images are projected onto the viewing screen alternate with intervals of darkness, and with the automatic structure of the invention such an interval of darkness is increased only to an extremely small extent so as to be hardly noticeable. Of course, if two or more consecutive empty slide compartments reach the operating range of the slide-changing means, this interval of darkness will be longer, but it is to be noted that the structure of the invention will repeatedly actuate the slide-changing means to carry out repeated operating cycles in a fully automatic manner until the next slide reaches the operating range of the slide-changing means.

What is claimed is:

1. In a photographic projector, slide-changing means movable through an operating cycle during which said slide-changing means shifts a slide from a magazine to a projecting position and then back to the magazine whereupon the magazine advances to bring the next slide into a position to be acted upon by the slide-changing means during the next operating cycle thereof, light-blocking means movable between a blocking position preventing light from passing through said projecting position and a nonblocking position permitting light to pass freely through said projecting position, actuating means for actuating said slide-changing means to carry out said operating cycle, operating means carried by said slide-changing means for movement therewith and movable with respect to said slide-changing means between a pair of operating positions in one of which said operating means operates said actuating means to bring about an operating cycle of said slide-changing means and in another of which said operating means operates on said light-blocking means to move the latter from said blocking to said non-blocking position thereof, said light-blockng means automatically returning to said blocking position thereof when said slide-changing means returns a slide from said projecting position to a magazine, and scanning means movable between a scanning position and an end position distant from said scanning position, said scanning means when in said scanning position thereof being situated in the path of movement of a slide from said magazine to said projecting position to be displaced by the slide from said scanning position to said end position, and said scanning means when in said end position thereof situating said operating means in said other operating position for moving said blocking means from said blocking to said non-blocking position in response to scanning of a slide moved by said slide-changing means from a magazine to the projecting position, said scanning means remaining in said scanning position thereof when there is no slide shifted by said slide-changing means during an operating cycle thereof and said scanning means when remaining in said scaning position thereof placing said operating means in said one operating position to operate said actuating means to automatically bring about the next operating cycle of said slide-changing means while said light-blocking means remains in said blocking position thereof.

2. The combination of claim 1 and wherein said scanning means is in the form of a slide member carrying a pair of camming elements one of which cams said operating means to said one position thereof when said scanning means remains in said scanning position and the other of which cams said operating means to said other position thereof when said scanning means is displaced by a slide to said end position thereof.

3. The combination of claim 2 and wherein said operating means is in the form of a lever turnably carried by said slide-changing means and having a cam-follower pin acted upon by said camming elements of said scanning means.

4. The combination of claim 1 and wherein a displacing means is carried in part by said scanning means and in part by said slide-changing means for displacing said scanning means from said end position thereof back to said scanning position upon return of said slide-changing means to a position locating a slide back in the magazine.

5. The combination of claim 4 and wherein said displacing means includes a camming pin carried by said slide-changing means for movement therewith and a camming surface forming part of said scanning means and situated in the path of movement of said pin when said scanning means is in said end position thereof to be engaged by said pin for displacing said scanning means back to said scanning position during the return of said slide-changing means to said position returning a slide to the magazine.

6. The combination of claim 1 and wherein said slide-changing means is shiftable back and forth along a given path during each operating cycle thereof, said scanning means being in the form of a slide member movable perpendicularly to said path between said scanning and end positions, said slide member extending across part of said slide-changing means, and said operating means being in the form of a lever turnably carried by said slide-changing means at said part thereof across which said slide member extends, said scannnig means including in addition to said slide member a pair of camming elements and said lever of said operating means having a cam-follower pin engaged by one of the other of said camming elements depending upon the position of said scanning means, one of said camming elements displacing said lever to said one operating position when said scanning means remains in said scanning position if there is no slide displaced during an operating cycle of said slide-changing means and the other of said camming elements cooperating with said cam-follower pin to displace said lever to said other operating position when said scanning means is displaced to said end position thereof by a slide shifted by said slide-changing means, said light-blocking means being in the form of a turnable plate having an edge portion situated in the path of movement of said lever when the latter is in said other position thereof to be turned by said lever from said blocking to said non-blocking position and said plate being formed with a cutout receiving said lever when the latter is in said one position thereof so that said plate remains in said blocking position, and said actuating means being situated in the path of movement of said lever when the latter is received in said cutout of said plate for automatically initiating the next operating cycle of said slide-changing means.

References Cited
UNITED STATES PATENTS

| | | | |
|---|---|---|---|
| 2,724,989 | 11/1955 | Badalich | 88—28 |
| 3,114,286 | 12/1963 | Brueckner et al. | 88—28 |
| 3,180,212 | 4/1965 | Hillegonds et al. | 88—28 |
| 3,263,560 | 8/1966 | Golden | 88—28 |
| 3,334,544 | 8/1967 | Zillmer | 88—28 |

NORTON ANSHER, *Primary Examiner.*

R. M. SHEER, *Assistant Examiner.*